(No Model.)

J. G. JEBB.
PULLEY COVER.

No. 377,161. Patented Jan. 31, 1888.

United States Patent Office.

JOHN GLADWYN JEBB, OF LONDON, COUNTY OF MIDDLESEX, ENGLAND.

PULLEY-COVER.

SPECIFICATION forming part of Letters Patent No. 377,161, dated January 31, 1888.

Application filed June 28, 1887. Serial No. 242,764. (No model.) Patented in England September 3, 1885, No. 10,435.

*To all whom it may concern:*

Be it known that I, JOHN GLADWYN JEBB, a subject of the Queen of Great Britain, residing at London, England, have invented a new and useful Pulley-Cover, (of which I have filed a provisional specification in the English Patent Office, No. 10,435, bearing date September 3, 1885;) and I do hereby declare that the following is a full and exact description thereof, reference being had to the accompanying drawings, and to the letters of reference marked thereon, making a part of this specification, in which—

Figure 1:
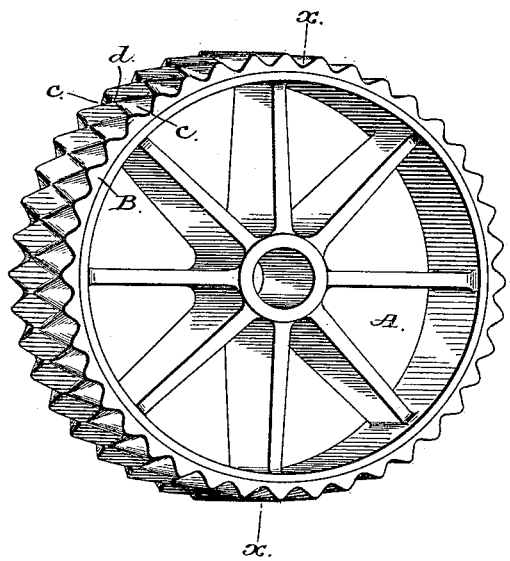
Figure 2:
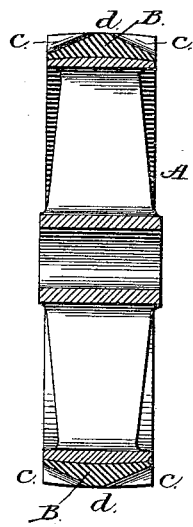

Figure 1 is a view in perspective of a driving-pulley having my improved rubber tire applied thereto, and Fig. 2 a diametric section of said pulley with the improved tire thereon.

My invention relates to an elastic or semi-elastic facing for a driving or driven pulley, whereby a firmer hold of the belt upon the pulley is obtained and its slipping prevented; and the object thereof is to enable any ordinary pulley to be quickly fitted and covered with such a facing in order more particularly to adapt the same for use with an endless transversely-corrugated driving-belt made of thin metal, substantially in manner as described in the English Letters Patent to Patrick Adie, dated June 1, 1885, No. 6,642.

By means of my said invention I am enabled to adapt a corrugated metallic belting with great ease and economy to existing plant. Instead of replacing for this purpose the smooth pulleys generally used in connection with leather, cotton, and other flexible belting by toothed wheels, or of attaching transversely-corrugated strips to the peripheries of said pulleys, I need only stretch my improved tire of india-rubber or equivalent elastic yielding material over the pulley.

A in the drawings represents a pulley whose face may be plain, but which preferably is left in the rough state in which it comes from the mold in which it was cast.

B represents an endless band or tire of india-rubber or other equivalent elastic material of a diameter normally slightly less than that of the pulley to which it is to be applied. This endless band or tire is formed in manner as is well known to the art. Its inner face is left smooth and plain. Its outer face is transversely corrugated with grooves or recesses, each of which, $c\ c\ c$, gradually widens and increases in depth from a circumferential line or band, $d$, Fig. 2, of maximum thickness in the center out at a right angle therewith to the edge of the tire on either side, as illustrated in Figs. 1 and 2.

The elastic tire B may be quickly applied to any pulley in use by simply stretching the tire over the face of the pulley, upon which it will be held tight by its contractile power. If it is to remain permanently thereon, a suitable cement may be applied between the tire and pulley to unite them more firmly.

By the use of my invention in connection with metallic belting I gain the following important advantages — viz., a diminution in wear of the belt, and consequently a great increase in its life, silence in action, less tendency of the belt to run off the pulley, and easy and cheap adaptability to existing plant.

I am aware that it is not new to apply as a facing or covering for a pulley a fabric of india-rubber, leather, paper, or other yielding material. My invention differs from all coverings of this character heretofore employed in the fact that the covering, which is formed complete in itself in the form of a tire independently of the pulley, so that it may be readily and quickly applied to any pulley of the proper dimensions by simply stretching and fitting it in place over the same, is transversely corrugated upon its outer face or periphery to adapt it to receive a corrugated metallic belting, substantially in the manner as shown, for the purpose set forth.

I claim as my invention—

As a facing for pulleys, an endless band of india-rubber transversely corrugated on its outer face with grooves deepening from the center of the band toward either edge thereof, substantially in the manner and for the purpose herein set forth.

In testimony whereof I have signed my name to this specification in the presence of two subscribing witnesses.

JOHN GLADWYN JEBB.

Witnesses:
ALEX. G. JOHNSTON,
MANUEL ALTORMIRANO.